US012645205B2

(12) United States Patent
Narayanan et al.

(10) Patent No.: US 12,645,205 B2
(45) Date of Patent: Jun. 2, 2026

(54) IMPLEMENTING BIDIRECTIONAL DATA TRANSFER WITH DATA DIODES

(71) Applicant: Rockwell Automation, Inc., Milwaukee, WI (US)

(72) Inventors: Sudheeshchandran Narayanan, Dubai (AE); Biswajit Sahu, Bangalore (IN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 336 days.

(21) Appl. No.: 18/467,572

(22) Filed: Sep. 14, 2023

(65) Prior Publication Data

US 2025/0093858 A1     Mar. 20, 2025

(51) Int. Cl.
G05B 19/41       (2006.01)
G05B 19/418      (2006.01)

(52) U.S. Cl.
CPC ............................... G05B 19/41835 (2013.01)

(58) Field of Classification Search
CPC ............................................... G05B 19/41835
See application file for complete search history.

(56) References Cited

U.S. PATENT DOCUMENTS

| | | | |
|---|---|---|---|
| 2012/0017079 A1* | 1/2012 | Mraz ..................... | H04L 9/3236 |
| | | | 713/153 |
| 2012/0304040 A1* | 11/2012 | Bender .............. | H03M 13/096 |
| | | | 714/776 |
| 2021/0089526 A1* | 3/2021 | Nixon ................. | G06F 16/9024 |
| 2022/0300502 A1* | 9/2022 | Enver ................. | G06F 21/6218 |
| 2023/0370203 A1* | 11/2023 | Srinivasan ............ | H04L 1/1809 |
| 2024/0406002 A1* | 12/2024 | Venkatesan ........... | H04L 9/3247 |

* cited by examiner

*Primary Examiner* — Christopher W Carter
(74) *Attorney, Agent, or Firm* — Fletcher Yoder, P.C.

(57)       ABSTRACT

An edge device may include transmitter circuitry and receiver circuitry. The transmitter circuitry may receive process data associated with an industrial system from a control system of the industrial system, and may transmit the process data to receiver circuitry via a first data diode. The receiver circuitry may receive the process data from the transmitter circuitry, transmit an acknowledgement packet to the transmitter circuitry via a second data diode, and transmit the process data to a computing device.

20 Claims, 6 Drawing Sheets

IMPLEMENTING BIDIRECTIONAL DATA TRANSFER WITH DATA DIODES

BACKGROUND

This disclosure generally relates to communication between networks. More particularly, embodiments of the present disclosure relate to network communication techniques that establish data isolation between networks.

Generally, an operational technology (OT) system may facilitate performance of an industrial automation process by controlling operation of one or more automation devices. For example, to facilitate performing an industrial automation process, the OT system may determine a control action and instruct an automation device (e.g., a rod-pump) to perform the control action. Additionally, the OT system may facilitate monitoring performance of the process to determine whether the process is operating as desired. When not operating as desired, the OT system may also facilitate performing diagnostics on the process to determine cause of undesired operation.

An OT system may transmit collected data from the industrial automation system to an information technology (IT) network, and the IT network may enable further analysis or interpretation of the collected data. The IT network may, for example, comprise a cloud-based computing system, and an edge device may facilitate data transfer between the OT system and the cloud-based computing system. The efficiency of an industrial automation process may be limited by security threats, transfer speeds, and so on of communications between the OT system and the IT network. As such, a secure and efficient system for data transfer is desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, an edge device may include transmitter circuitry and receiver circuitry. The transmitter circuitry may receive process data associated with an industrial system from a control system of the industrial system, and may transmit the process data to receiver circuitry via a first data diode. The receiver circuitry may receive the process data from the transmitter circuitry, transmit an acknowledgement packet to the transmitter circuitry via a second data diode, and transmit the process data to a computing device.

In another embodiment, a method may include receiving, via one or more processors, process data associated with an industrial system routed through a first data diode. The method may then include sending an acknowledgement packet to transmitter circuitry in response to receiving the process data. The method may then include sending the process data to a computing device.

In yet another embodiment, a non-transitory computer-readable medium may include computer-executable instructions that, when executed, may cause processing circuitry to perform operations including receiving process data associated with an industrial system from a control system of the industrial system. The instructions may then cause the processing circuitry to route the process data to receiver circuitry through a first data diode, and the receiver circuitry may transmit the process data to a computing device. The instructions may then cause the processing circuitry to receive an acknowledgement packet from the receiver circuitry.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
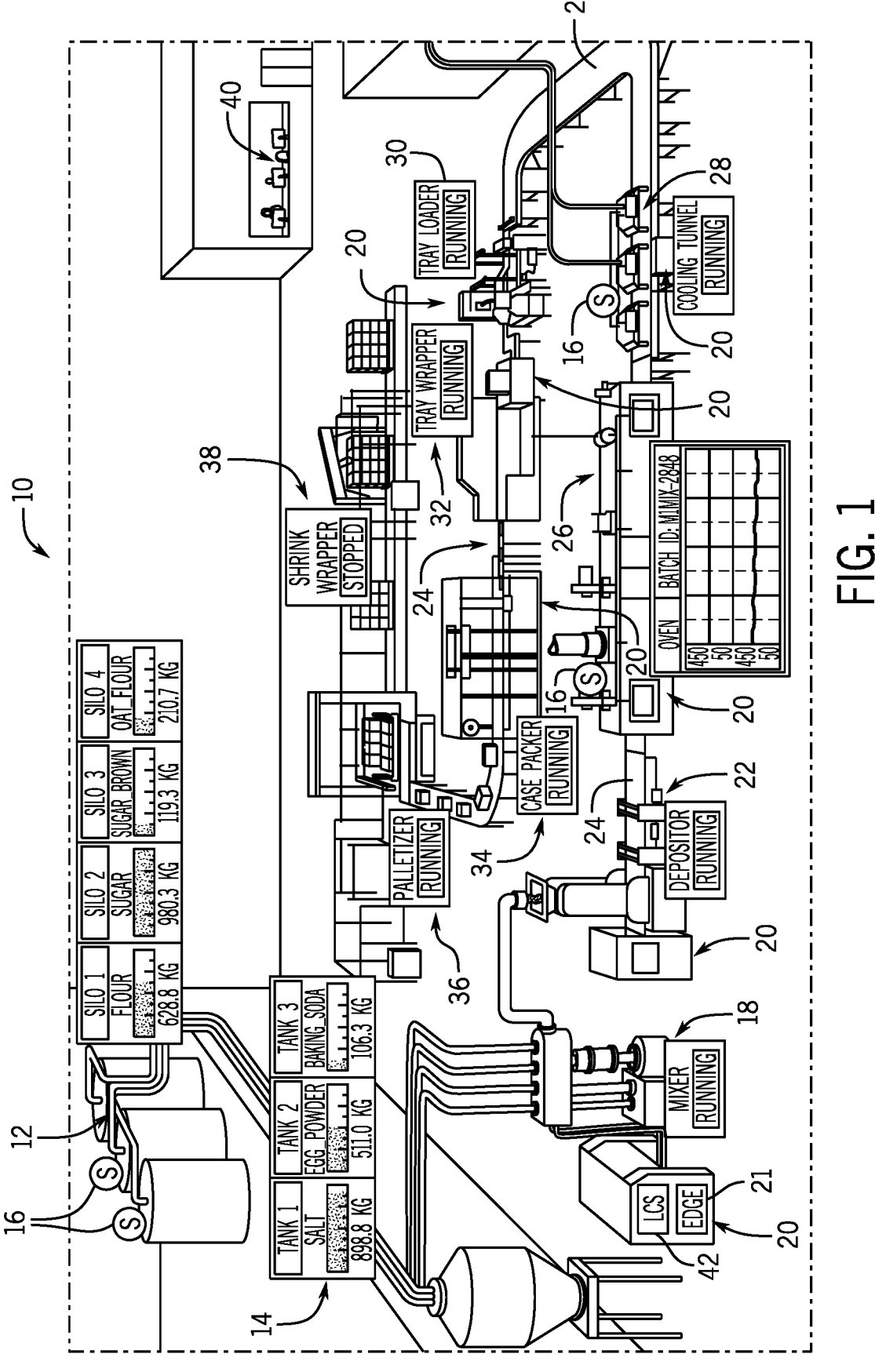
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, an OT system may control operation of one or more automation devices to facilitate performing an industrial automation process. Industrial automation processes may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, an OT system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

To improve operation, the OT system may monitor performance of the one or more automation devices and/or the industrial automation process as a whole. For example, the OT system may determine whether operation is as desired by analyzing process data. As used herein, "process data" is intended to describe data indicative of operation of an industrial automation process. For example, the process data may include inputs to the industrial automation process, outputs from the industrial automation process, disturbance variables (e.g., environmental conditions), constraints on operation, operational parameters (e.g., temperature, speed, load, position, voltage, and/or pressure) of an automation device, and the like.

Additionally, the control system may perform diagnostics to facilitate identifying cause of undesired operation and remedying the undesired operation. For example, the control system may analyze the process data to determine a likely cause of undesired operation and possible steps to remedy the likely cause. As such, the control system may analyze the process data to facilitate performance monitoring and/or diagnostics.

With the foregoing in mind, as the process data is collected regularly (e.g., time-series data), the collected data may be transmitted to an onsite server, a cloud-computing system, a cloud-based service, or the like. Unfortunately, the systems that transmit the collected data may be targets of cyberattack by malicious actors, resulting in damage, loss of control of and/or access to assets and/or data, leakage, or theft of data, hardware, and software. To mitigate these cybersecurity vulnerabilities, analog, unidirectional communication techniques may be implemented to electrically isolate one network from another. However, these techniques lack facilitation of bidirectional updates, which may be problematic for an OT network that may use real-time feedback from a connected IT network, or an IT network that may use real-time feedback from a connected OT network.

Accordingly, as will be described in more detail below, the present disclosure provides techniques to improve efficiency of performance monitoring and/or diagnostics data transfer between OT and IT networks. In some embodiments, an edge device may include transmitter circuitry communicatively coupled to a control/monitoring device of an OT system, and receiver circuitry communicatively coupled to a device of an IT network. Process data may be routed through a first data diode of the edge device, and acknowledgement packets may then be routed through a second data diode of the edge device. The first data diode and the second data diode may only permit unidirectional communication, such that undesired communications, such as those included in cyberattacks, are not communicated between the transmitter circuitry and the receiver circuitry.

In some embodiments, receiver circuitry of an edge device may transmit a pre-configured acknowledgement pulse to transmitter circuitry of the edge device in response to receiving a process data packet. Because the transmitter may only receive the pre-configured acknowledgement pulse, unwanted transmissions, such as those included in cyberattacks, from the receiver circuitry to the transmitter circuitry are mitigated. Additionally, in some embodiments, the receiver circuitry is configured to verify the integrity of received process data packets using checksum algorithms. As such, the receiver circuitry only permits valid process data packets to be routed to devices of the IT network.

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, edge device 21, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20. The industrial automation devices 20 may also include the edge device 21 that may facilitate communications between the industrial automation devices 20, the local control system 42, computing devices, and cloud-based computing systems, as described herein.

Figure 2:
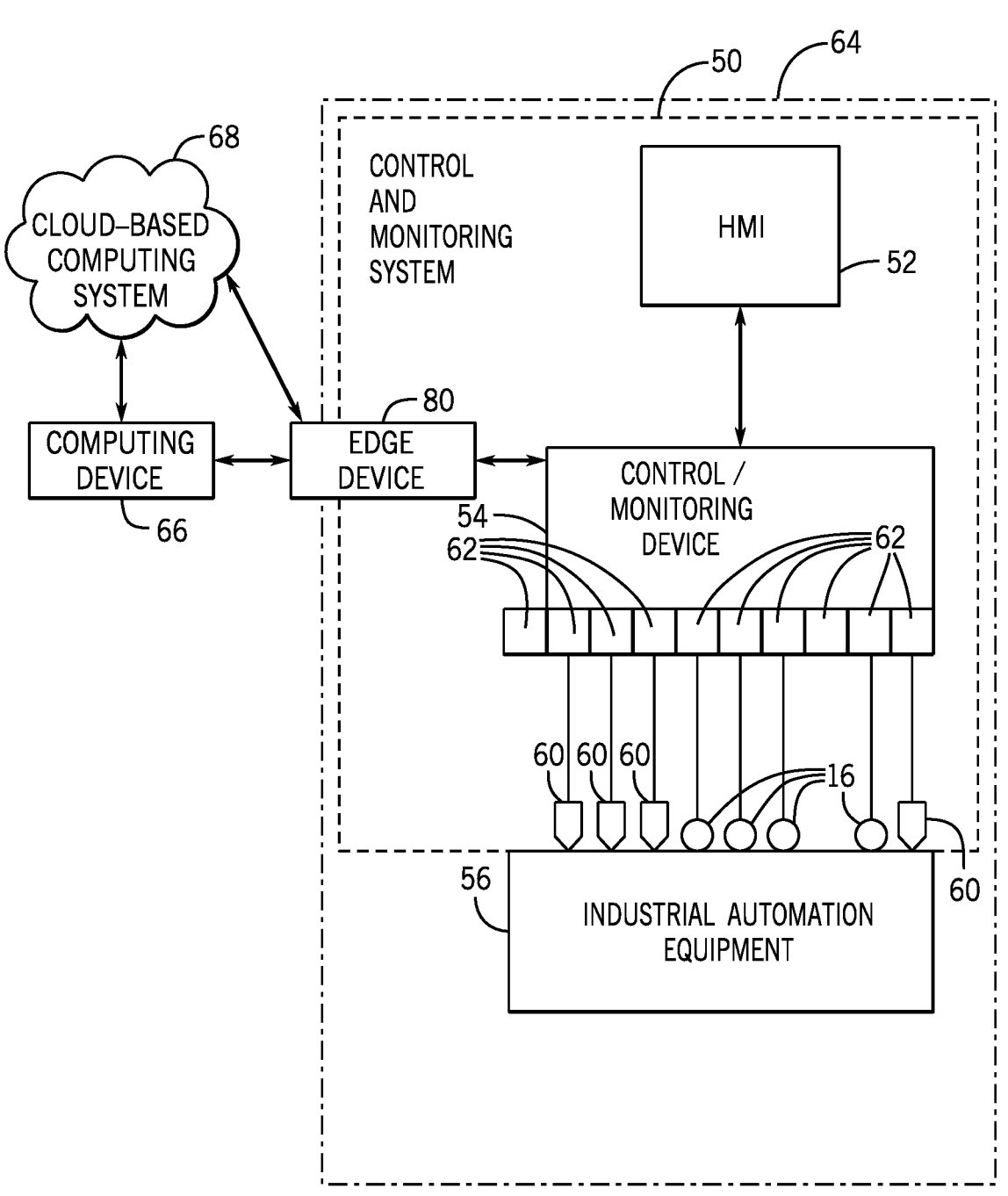
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary control and monitoring system 50 that may be employed in any suitable industrial automation system 10, in accordance with embodiments presented herein. In FIG. 2, the control and monitoring system 50 is illustrated as including a human machine interface (HMI) 52 and a control/monitoring device 54 or automation controller adapted to interface with devices that may monitor and control various types of industrial automation equipment 56. By way of example, the industrial automation equipment 56 may include the mixer 18, the depositor 22, the conveyor 24, the oven 26, and the other pieces of machinery described in FIG. 1.

It should be noted that the HMI 52 and the control/monitoring device 54, in accordance with embodiments of the present techniques, may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

As discussed above, the industrial automation equipment 56 may take many forms and include devices for accomplishing many different and varied purposes. For example, the industrial automation equipment 56 may include machinery used to perform various operations in a compressor station, an oil refinery, a batch operation for making food items, a mechanized assembly line, and so forth. Accordingly, the industrial automation equipment 56 may comprise a variety of operational components, such as electric motors, valves, actuators, temperature elements, pressure sensors, or a myriad of machinery or devices used for manufacturing, processing, material handling, and other applications.

Additionally, the industrial automation equipment 56 may include various types of equipment that may be used to perform the various operations that may be part of an industrial application. For instance, the industrial automation equipment 56 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 56 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.) and the like.

In certain embodiments, one or more properties of the industrial automation equipment 56 may be monitored and controlled by certain equipment for regulating control variables used to operate the industrial automation equipment 56. For example, the sensors 16 and actuators 60 may monitor various properties of the industrial automation equipment 56 and may adjust operations of the industrial automation equipment 56, respectively.

In some cases, the industrial automation equipment 56 may be associated with devices used by other equipment. For instance, scanners, gauges, valves, flow meters, and the like may be disposed on industrial automation equipment 56. Here, the industrial automation equipment 56 may receive data from the associated devices and use the data to perform their respective operations more efficiently. For example, a controller (e.g., control/monitoring device 54) of a motor drive may receive data regarding a temperature of a connected motor and may adjust operations of the motor drive based on the data.

In certain embodiments, the industrial automation equipment 56 may include a communication component that enables the industrial equipment 56 to communicate data between each other and other devices. The communication component may include a network interface that may enable the industrial automation equipment 56 to communicate via various protocols such as Ethernet/IP®, ControlNet®, DeviceNet®, or any other industrial communication network protocol. Alternatively, the communication component may enable the industrial automation equipment 56 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 60 may include any number of devices adapted to perform a mechanical action in response to a signal from a controller (e.g., the control/monitoring device 54). The sensors 16 and actuators 60 may be utilized to operate the industrial automation equipment 56. Indeed, they may be utilized within process loops that are monitored and controlled by the control/monitoring device 54 and/or the HMI 52. Such a process loop may be activated based on process inputs (e.g., input from a sensor 16) or direct operator input received through the HMI 52. As illustrated, the sensors 16 and actuators 60 are in communication with the control/monitoring device 54. Further, the sensors 16 and actuators 60 may be assigned a particular address in the control/monitoring device 54 and receive power from the control/monitoring device 54 or attached modules.

Input/output (I/O) modules 62 may be added or removed from the control and monitoring system 50 via expansion slots, bays or other suitable mechanisms. In certain embodiments, the I/O modules 62 may be included to add functionality to the control/monitoring device 54, or to accommodate additional process features. For instance, the I/O modules 62 may communicate with new sensors 16 or actuators 60 added to monitor and control the industrial automation equipment 56. It should be noted that the I/O modules 62 may communicate directly to sensors 16 or actuators 60 through hardwired connections or may communicate through wired or wireless sensor networks, such as Hart or IOLink.

Generally, the I/O modules 62 serve as an electrical interface to the control/monitoring device 54 and may be located proximate or remote from the control/monitoring device 54, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 62 may transfer input and output signals between the control/monitoring device 54 and the industrial automation equipment 56. As illustrated, the sensors 16 and actuators 60 may communicate with the control/monitoring device 54 via one or more of the I/O modules 62 coupled to the control/monitoring device 54.

In certain embodiments, the control/monitoring system 50 (e.g., the HMI 52, the control/monitoring device 54, the sensors 16, the actuators 60, the I/O modules 62) and the industrial automation equipment 56 may make up an industrial automation application 64. The industrial automation application 64 may involve any type of industrial process or system used to manufacture, produce, process, or package various types of items. For example, the industrial applications 64 may include industries such as material handling, packaging industries, manufacturing, processing, batch processing, the example industrial automation system 10 of FIG. 1, and the like.

In certain embodiments, the control/monitoring device 54 may be communicatively coupled to a computing device 66 and a cloud-based computing system 68 via an edge device 80. In this network, input and output signals generated from the control/monitoring device 54 may be communicated between the computing device 66 and the cloud-based computing system 68. Although the control/monitoring device 54 may be capable of communicating with the computing device 66 and the cloud-based computing system 68 via the edge device 80, as mentioned above, in certain embodiments, the control/monitoring device 54 (e.g., local computing system 42) may perform certain operations and analysis without sending data to the computing device 66 or the cloud-based computing system 68.

Figure 3:
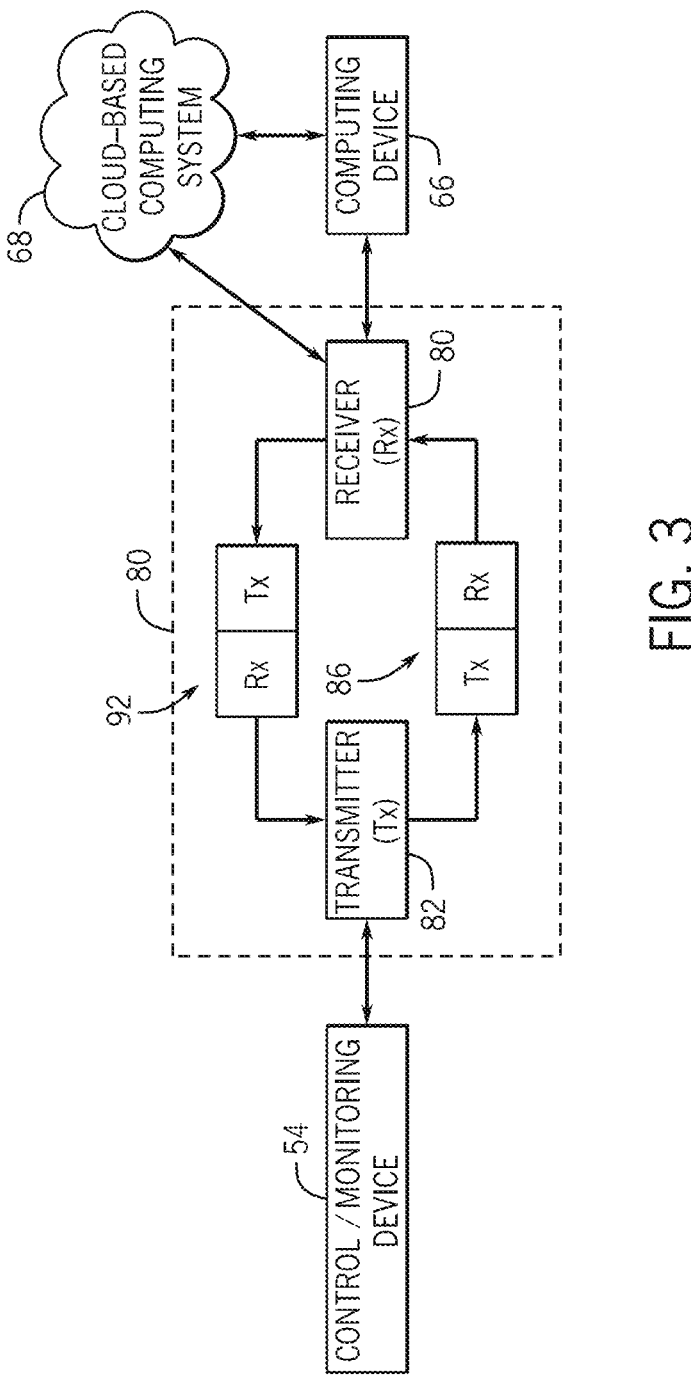
FIG. 3 illustrates a communication network of device that facilitates data transfer between a control/monitoring device and devices of an IT network using diode-based acknowledgement, in accordance with an embodiment.

As illustrated in FIG. 3, the control/monitoring device 54 may be communicatively coupled to the computing device 66 and/or the cloud-based computing system via an edge device, such as the exemplary edge device 80. The edge device 80 may provide wireless capabilities, security functions, and so forth, and may facilitate communications between devices that may be part of one or more networks. For example, the edge device 80 may facilitate Internet Protocol (IP) capabilities, such as User Datagram Protocol (UDP), between a first network including the control/monitoring device 54 and a second network including the computing device 66.

In the illustrated example, the edge device 80 may facilitate data transfers from the control/monitoring device 54 to the computing device 66 and/or the cloud-based computing system 68. Data transfer, as mentioned above, may include the transfer of process data, such as the input and output signals associated with the control and monitoring system 50 of FIG. 2. In the illustrated example, the edge device 80 includes transmitter circuitry 82 communicatively coupled to the control/monitoring device 54, and receiver circuitry 84 communicatively coupled to the computing device 66 and/or the cloud-based computing system 68. The transmitter circuitry 82 may receive process data from the control/monitoring device 54, and may transmit the process data to the receiver circuitry 84 via a first data diode 86.

As described herein, the first data diode 86 may include optical fibers, a light-emitting diode (LED), an electronic circuit, or other suitable means to allow unidirectional flow of data (e.g., process data) and prevent two-way communication. That is, the first data diode 86 may only allow data to be transferred from the transmitter circuitry 82 to the receiver circuitry 84, and may block an attempted transfer of data from the receiver circuitry 84 to the transmitter circuitry 82. As such, undesired data, such as data sent in error, data sent as part of a cyberattack, and so on, is blocked from being transferred from the receiver circuitry 84 to the transmitter circuitry 82 via the first data diode 86. Thus, data isolation may be preserved and unauthorized access, data leakage, and so on is mitigated. Further, the first data diode 86 may allow certain data (e.g., input and output data) to be sent from the transmitter circuitry 82 to the receiver circuitry 84, and may prevent transmission of other data.

Additionally, the edge device 80 may include a second data diode 92, and acknowledgement signals (e.g., packets) may be transmitted from the receiver circuitry 84 to the transmitter circuitry 82 via the second data diode 92. An acknowledgement signal may be sent from the receiver circuitry 84 to the transmitter circuitry 82 in response to the receiver circuitry 84 receiving the process data (e.g., a packet of process data, a packet of input and output signals, etc.). As with the first data diode 86, the second data diode 92 may allow unidirectional flow of data. That is, the second data diode 92 allows data to be transferred from the receiver circuitry 84 to the transmitter 82, and may block data from being transferred from the transmitter circuitry 82 to the receiver circuitry 84. Further, the second data diode 92 may only allow certain data, such as acknowledgement signals, to be transferred from the receiver circuitry 84 to the transmitter circuitry 82.

Figure 4:
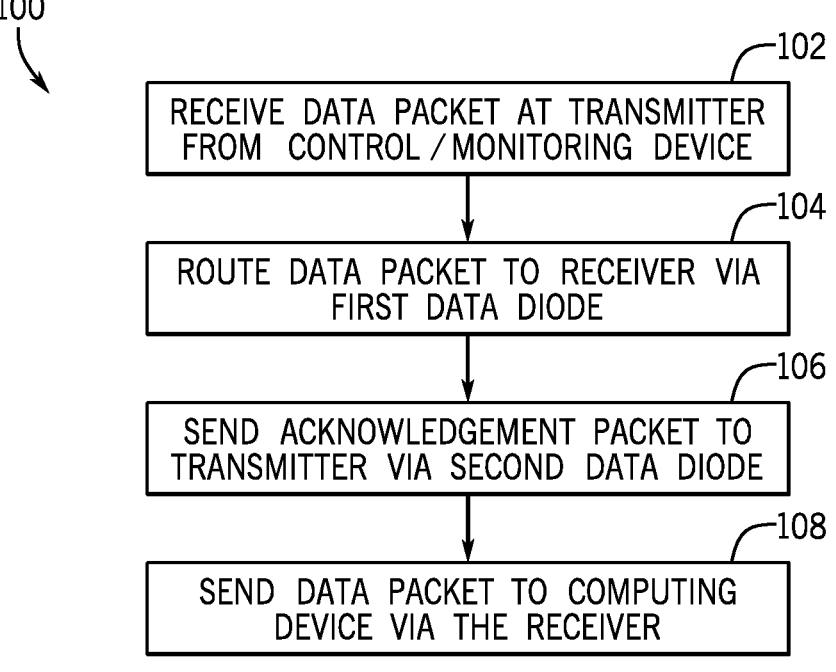
FIG. 4 illustrates a flow chart of a method for data transfer using diode-based acknowledgement, in accordance with an embodiment.

With the foregoing in mind, FIG. 4 illustrates a flow chart of a method 100 for data transfer between the control/monitoring device 54 and the computing device 66 using diode-based acknowledgement. Although the method 100 is described as being performed by the edge device 80 communicatively coupling the control/monitoring device 54 and the computing device 66, it should be noted that the method 100 may be performed by an edge device that communicatively couples other devices of the automation system 10, or other suitable computing devices, such as the cloud-based computing system 68.

Additionally, although the method 100 is described as being performed in a particular order, it should be understood that the method 100 may be performed in any suitable order. Referring now to FIG. 4, at block 102, the edge device 80 may receive process data from the control/monitoring device 54. The process data may be associated with the automation system 10, input and output signals generated from the control/monitoring system 54, and the like. Further, the process data may be altered (e.g., partitioned, combined, encapsulated, encoded, etc.) by the transmitting device (e.g., control/monitoring device 54) to ease or improve communication between the communicatively coupled devices. For example, the process data may be altered such that it forms one or more datagrams to allow for User Datagram Protocol (UDP) operation.

At block 104, a data packet of the process data may be routed to the receiver circuitry 84 via the first data diode 86. The data packet may include a portion of the process data and may be formed by one of the aforementioned alterations to the process data. In other embodiments, the data packet may include the entire process data or multiple process data units received by the edge device 80. The first data diode 86 may include security capabilities (e.g., cryptography) to route only select data packets through the first data diode 86. These security capabilities may be variable and/or configurable, and may depend on, for example, a type of process data to be transmitted from the control/monitoring device 54 to the computing device 66. As mentioned above, the first data diode 86 allows unidirectional communication between communicatively coupled devices, and, as such, may block communications in an opposite direction (i.e., from the receiver circuitry 84 to the transmitter circuitry 82).

At block 106, an acknowledgement packet is sent to the transmitter circuitry 82 via the second data diode 92 in response to the receiver circuitry 84 receiving a data packet. The acknowledgement packet may be generated by the receiver circuitry 84 based on the received data packet. In some embodiments, the received data packet may include header information along with payload information, and the receiver circuitry 84 may generate the acknowledgement packet based on the header information and/or the payload information. For example, the receiver circuitry 84 may, based on header information in a received data packet, determine that a data packet has been sent out of sequence, and may not send an acknowledgement packet in response. In another example, the receiver circuitry 84 may determine that a data packet has been lost or duplicated, and may, in response, alter an acknowledgment packet to indicate a transmission error. In other embodiments, the acknowledgement packet is generated prior to the receiver circuitry 84 receiving a data packet, and/or may be independent of the contents of the data packet.

In some embodiments, an acknowledgement packet is sent from the edge device 80 to the computing device 66, cloud-based computing system 68, or the control/monitoring device 54. For example, if the receiver circuitry 84 determines that a data packet has been tampered with during or prior to transmission, an acknowledgement packet indicative of a security breach may be sent to the cloud-based computing system 68. In response, the cloud-based computing system 68 may present a notification indicative of a security breach to an operator of the automation system 10.

In response to receiving an acknowledgement packet from the receiver circuitry 84 via the second data diode 92, the transmitter circuitry 82 may transmit a subsequent data packet of the process data. The transmitter circuitry 82 may also determine that there are no remaining data packets to be transmitted (e.g., when the entire process data has been transmitted), and may stop transmission, or send a signal indicative of a transmission being completed to the control/monitoring device 54. Alternatively, if the acknowledgement packet indicates, for example, a transmission error, the transmitter circuitry 82 may pause transmission, and the edge device 80 may transmit a signal indicative of the transmission error to the control/monitoring device 54, the computing device 66, or the cloud-based computing system 68. In some embodiments, the transmitter circuitry 82 may transmit subsequent data packets before or simultaneous to receiving an acknowledgement packet if, for example, proper sequencing of process data communications is not necessary for operation of the automation system.

At block 108, a data packet is sent to the computing device 66 via the receiver circuitry 84. Block 108 may be performed simultaneously with block 106, or may be performed after a specified or determined amount of (e.g., a complete unit of process data) data packets have been transmitted from the transmitter circuitry 82 to the receiver circuitry 84 via the first data diode 86. Further, it should be noted that, while block 108 describes a single data packet being sent to the computing device 66 via the receiver circuitry 84, multiple (e.g., a sequence or combination of) data packets may be sent as part of block 108. For example, sequential data packets may combine to form input and output signals generated by the control/monitoring device 54, and the sequential data packets may be sent simultaneously, and/or in combination, to the computing device 66 in response to the receiver circuitry 84 receiving all sequential data packets. Thus, while data packets may be sent individually or sequentially from the transmitter circuitry 82 to the receiver circuitry 84 via the first data diode 86, the data packets may be analyzed together (e.g., as a complete unit of process data) at the computing device 66. Likewise, in embodiments in which the receiver circuitry 84 is communicatively coupled to the cloud-based computing system 68 (e.g., over wide-area network), sequential data packets may be continuously transmitted (e.g., streamed) to the cloud-based computing system 68, or transmitted together as process data.

Figure 5:
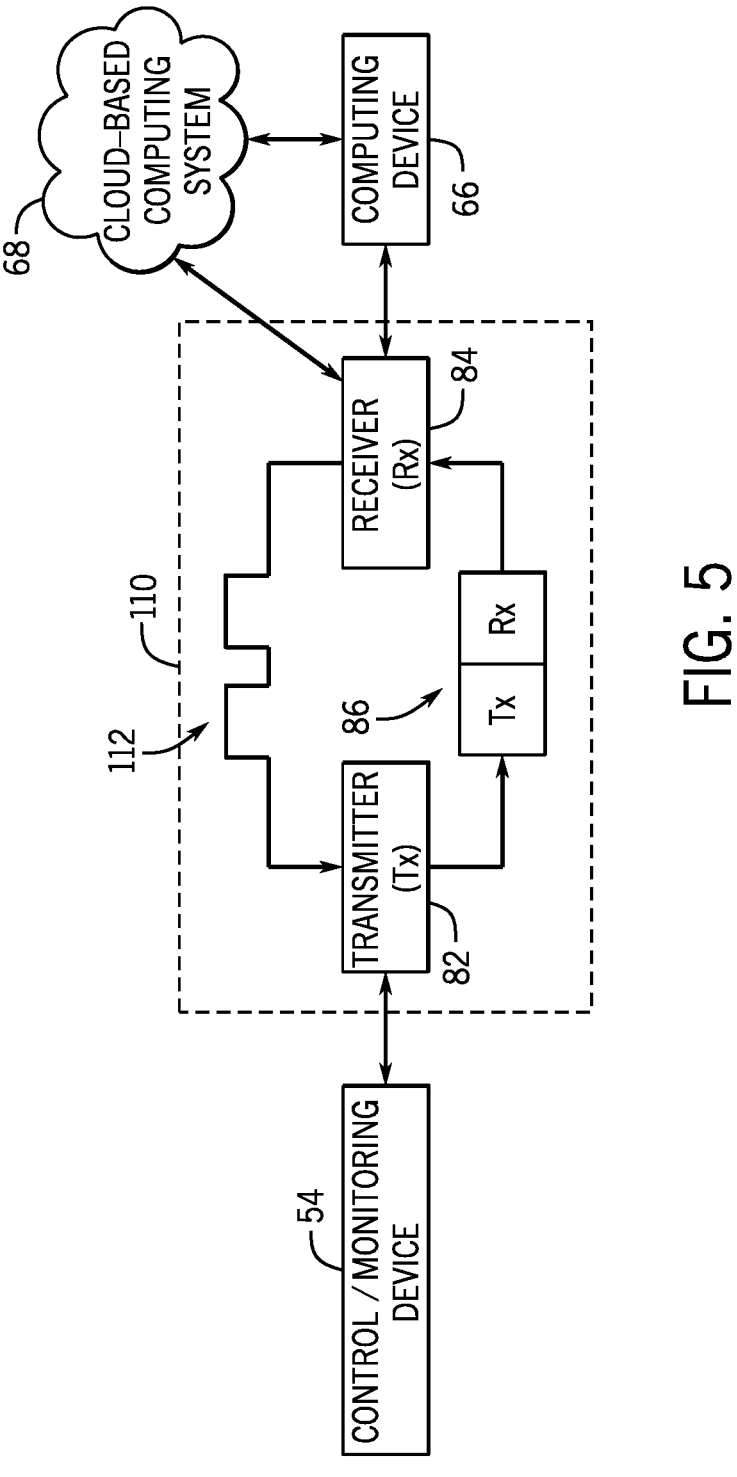
FIG. 5 illustrates a communication network of a device that facilitates data transfer between a control/monitoring device and devices of an IT network using pulse-based acknowledgement, in accordance with an embodiment.

With the foregoing in mind, FIG. 5 illustrates an exemplary communication network that includes edge device 110, and that facilitates communication between the control/monitoring device 54 and the computing device 66 using a pulse-based acknowledgement. As with the edge device 80 of FIG. 3, the edge device 110 may provide wireless capabilities, security functions, and so forth, and may facilitate communications between devices of one or more networks. Additionally, the edge device 110 may provide Internet Protocol (IP) capabilities, such as User Datagram Protocol (UDP), between a first network of the control/monitoring device 54 and a second network of the computing device 66.

As described above with regard to the edge device 80, the edge device 110 facilitates data transfer from the control/monitoring device 54 to the computing device 66 and the cloud-based computing system 68. Data transfer, as mentioned above, may include process data, such as the input and output signals associated with the control and monitoring system 50 of FIG. 2. In the illustrated example, the edge device 80 includes transmitter circuitry 82 communicatively coupled to the control/monitoring device 54, and receiver circuitry 84 communicatively coupled to the computing device 66 and/or the cloud-based computing system 68. The transmitter circuitry 82 receives process data (e.g., process data from the automation system 10, input and output signals generated by the control/monitoring system 54, and so on) from the control/monitoring device 54, and transmits the process data to the receiver circuitry via a first data diode 86. As mentioned above, the first data diode 86 may allow unidirectional flow of data (e.g., process data) from the transmitter circuitry 84 to the receiver circuitry 84.

Further, the receiver circuitry 84 may transmit an acknowledgement signal 112 to the transmitter circuitry via a signal line (e.g., signal-carrying electrical wire). The acknowledgement signal 112 may include a high voltage or low voltage (e.g., 1 Volt, 0 Volts), a square wave, an impulse train, or any other suitable acknowledgement signal. Further, the acknowledgement signal 112 may include a pre-defined signal pattern, such that the transmitter circuitry 82 may verify integrity of the acknowledgement signal 112 based on a comparison between the acknowledgement signal and the pre-configured signal. Further, the acknowledgement signal 112 may be sent in response to the receiver circuitry 84 receiving a data packet from the transmitter circuitry 82 via the first data diode 86. Additionally, the acknowledgement signal 112 may be generated based on one or more qualities of a received data packet, as described herein.

Figure 6:
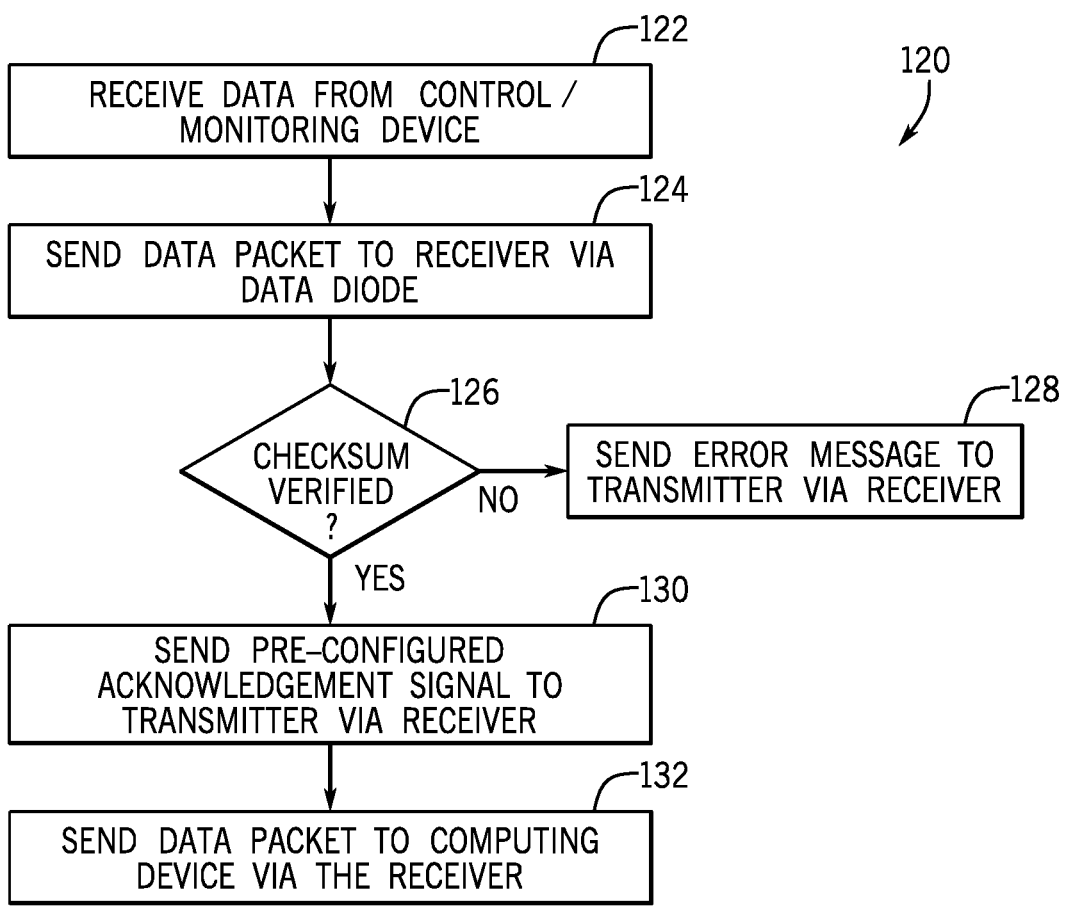
FIG. 6 is a flow chart of a method for data transfer using pulse-based acknowledgement, in accordance with an embodiment.

With the above in mind, FIG. 6 illustrates a flow chart of a method 120 for data transfer between the control/monitoring device 54 and the computing device 66 using pulse-based acknowledgement. At block 122, which may be generally described by the block 102 of the method 100, the edge device 110 may receive process data from the control/monitoring device 54. As mentioned, the process data may include process data associated with the automation system 10, input and output signals generated from the control/monitoring system 54, and the like. Further, the process data may be altered (e.g., partitioned, combined, encapsulated, encoded, etc.) to ease communication between the communicatively coupled devices.

At block 124, which may be generally described by the block 104 of the method 100, a data packet of the process data is routed to the receiver circuitry 84 via the first data diode 86. As mentioned above, the data packet may include a portion of the process data, and may be formed by the aforementioned alterations to the process data. In particular, the data packet may include a first checksum verification value, which may be calculated using a checksum algorithm. As mentioned, the first data diode 86 allows unidirectional communication between communicatively coupled devices, and, as such, may block communications from the receiver circuitry 84 to the transmitter circuitry 82.

At block 126, the receiver circuitry 84 receives the data packet and verifies (e.g., validates) the data packet using a checksum verification. The checksum verification may include, for example, the receiver circuitry 84 applying the checksum algorithm to the data packet to produce a second checksum verification value, and comparing the second checksum verification value to the first checksum verification value. Checksum verification may indicate whether the data packet has been duplicated, compromised, tampered with, or is otherwise sub-optimal.

If the data packet is verified via checksum verification, at block 130, an acknowledgement signal 112 including a pre-configured acknowledgement signal is sent to the transmitter circuitry 82, as shown in FIG. 5. The transmitter circuitry 82 may determine an acknowledgement validity based on a comparison between the acknowledgement signal 112 and the pre-configured acknowledgement signal. For example, if the pre-defined acknowledgement signal includes two high pulses with a 50% duty cycle, and acknowledgement signal 112 includes the same, the transmitter circuitry 82 may determine the acknowledgement validity.

In response to determining the validity of the acknowledgement signal 112, the transmitter circuitry 82 may transmit a subsequent data packet of the process data. The transmitter circuitry 82 may also determine that there are no remaining data packets of the process data to be transmitted, and may stop transmission, or send a signal indicative of a transmission being completed to the control/monitoring device 54, the computing device 66, or the cloud-based computing system 68.

At block 132, a data packet is sent to the computing device 66 via the receiver circuitry 84. Block 132 may be performed after a specified or determined amount (e.g., a sequence including all process data to be transmitted) of data packets have been transmitted from the transmitter circuitry 82 to the receiver circuitry 84 via the first data diode 86. Further, it should be noted that, while block 132 describes a single data packet being sent to the computing device 66 via the receiver circuitry 84, multiple (e.g., a sequence or combination of) data packets may be sent as part of block 132. For example, sequential data packets may combine to form (e.g., regenerate) input and output signals generated by the control/monitoring device 54, and the sequential data packets may be sent simultaneously, and/or in combination, to the computing device 66 in response to the receiver circuitry 84 receiving all sequential data packets. Thus, while data packets may be sent sequentially from the transmitter circuitry 82 to the receiver circuitry 84 via the first data diode 86, the data packets may be analyzed together (e.g., as a combination) at the computing device 66. Likewise, in embodiments in which the receiver circuitry 84 is communicatively coupled to the cloud-based computing system 68 (e.g., over wide-area network), sequential data packets may be continuously transmitted (e.g., streamed) to the cloud-based computing system 68, or transmitted as one.

Returning to block 126, if the checksum of the data packet is not verified, at block 128, the receiver circuitry 84 may send an acknowledgement signal 112 including a pre-configured error signal. In response to determining that the acknowledgement signal 112 matches the pre-configured error signal, the transmitter circuitry 82 may pause transmission and/or transmit a signal indicative of the transmission error to the control/monitoring device 54, the computing device 66, or the cloud-based computing system 68.

Further, if the transmitter circuitry 82 determines that the acknowledgement signal 112 does not match the pre-configured acknowledgement signal or the pre-configured error signal, the transmitter circuitry 82 may block or disregard the signal, and may send a signal indicative of a security breach to the control/monitoring device 54, the computing device 66, or the cloud-based computing system 68. This may mitigate, for example, cyberattacks that include signals that do not include the pre-configured acknowledgement signal or the pre-configured error signal.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present embodiments described herein have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An edge device, comprising:
transmitter circuitry configured to:
  receive process data associated with an industrial system from a control system of the industrial system;
  transmit the process data to receiver circuitry via a first data diode configured to transmit the process data unidirectionally towards the receiver circuitry; and
the receiver circuitry configured to:
  receive the process data from the transmitter circuitry;
  determine a validity of the process data based on a checksum associated with the process data;
  transmit an acknowledgement packet comprising a pre-configured signal to the transmitter circuitry via a second data diode based on the validity of the process data, wherein the receiver circuitry is configured to transmit the acknowledgement packet unidirectionally towards the transmitter circuitry, wherein the transmitter circuity is configured to:
    determine whether the pre-configured signal of the acknowledgement packet corresponds to a pre-configured error signal comprising one or more pulses associated with a duty cycle; and
    pause transmission of data in response to determining that the pre-configured signal of the acknowledgement packet corresponds to the pre-configured error signal; and
  transmit the process data to a computing device in response to determining that the process data is valid.

2. The edge device of claim 1, wherein each of the first data diode and the second data diode is configured to prevent two-way communication.

3. The edge device of claim 2, wherein the first data diode is configured to only allow a first communication from being transmitted from the transmitter circuitry to the receiver circuitry, and wherein the second data diode is configured to only allow a second communication from being transmitted from the receiver circuitry to the transmitter circuitry.

4. The edge device of claim 1, wherein the receiver circuitry is configured to transmit the acknowledgement packet to the transmitter circuitry via the second data diode in response to receiving the process data.

5. The edge device of claim 1, wherein the process data comprises one or more data packets.

6. The edge device of claim 1, wherein the transmitter circuitry is configured to:
  partition the process data into a plurality of data packets; and
  transmit the plurality of data packets to the receiver circuitry via the first data diode; and
  wherein the receiver circuitry is configured to:

receive each of the plurality of data packets, wherein the acknowledgement packet corresponds to a confirmation of the receiver circuitry receiving at least one of the plurality of data packets.

7. The edge device of claim 6, wherein the receiver circuitry is configured to:
  combine the plurality of data packets to regenerate the process data; and
  transmit the process data to the computing device.

8. The edge device of claim 1, wherein the process data corresponds to an operation of an industrial automation process performed in the industrial system.

9. The edge device of claim 1, wherein the industrial system comprises an operational technology (OT) system and an information technology (IT) network, wherein the OT system comprises the control system, and wherein the IT network comprises the computing device.

10. The edge device of claim 1, wherein the receiver circuitry is configured to transmit the process data to a cloud-based computing system.

11. A non-transitory computer-readable medium comprising computer-executable instructions that, when executed, are configured to cause processing circuitry to perform operations comprising:
  receiving process data associated with an industrial system from a control system of the industrial system;
  routing the process data to receiver circuitry via a first data diode configured to transmit the process data unidirectionally towards the receiver circuitry, wherein the receiver circuitry is configured to:
    receive the process data from transmitter circuitry;
    determine a validity of the process data based on a checksum associated with the process data;
    transmit an acknowledgement packet comprising a pre-configured signal to the transmitter circuitry via a second data diode based on the validity of the process data, wherein the receiver circuitry is configured to transmit the acknowledgement packet unidirectionally towards the transmitter circuitry;
    transmit the process data to a computing device in response to determining that the process data is valid; and
  receiving the acknowledgement packet from the receiver circuitry;
  determining whether the pre-configured signal of the acknowledgement packet corresponds to a pre-configured error signal comprising one or more pulses associated with a duty cycle; and
  pausing transmission of data in response to determining that the pre-configured signal of the acknowledgement packet corresponds to the pre-configured error signal.

12. The non-transitory computer-readable medium of claim 11, wherein the computer-executable instructions that, when executed, are configured to cause the processing circuitry to perform the operations comprising:
  partitioning the process data into a plurality of data packets; and
  routing the plurality of data packets to the receiver circuitry via the first data diode, wherein the receiver circuitry is configured to receive each of the plurality of data packets, and wherein the acknowledgement packet corresponds to a confirmation of the receiver circuitry receiving at least one of the plurality of data packets.

13. The non-transitory computer-readable medium of claim 11, wherein the process data comprises one or more data packets.

14. The non-transitory computer-readable medium of claim 11, wherein the process data corresponds to an operation of an industrial automation process performed in the industrial system.

15. A method, comprising:

receiving, via one or more processors, process data associated with an industrial system routed through a first data diode configured to transmit the process data unidirectionally towards receiver circuitry from transmitter circuitry;

determining a validity of the process data based on a checksum associated with the process data;

sending, via the one or more processors, an acknowledgement packet comprising a pre-configured signal to the transmitter circuitry via a second data diode based on the validity of the process data, wherein the receiver circuitry is configured to transmit the acknowledgement packet unidirectionally towards the transmitter circuitry, wherein the transmitter circuitry is configured to:

determine whether the pre-configured signal of the acknowledgement packet corresponds to a pre-configured error signal comprising one or more pulses associated with a duty cycle; and pause transmission of data in response to determining that the pre-configured signal of the acknowledgement packet corresponds to the pre-configured error signal; and sending, via the one or more processors, the process data to a computing device in response to determining that the process data is valid.

16. The method of claim 15, wherein each of the first data diode and the second data diode is configured to prevent two-way communication.

17. The method of claim 15, comprising:

validating, via the one or more processors, the process data based on a checksum algorithm; and generating, via the one or more processors, the acknowledgement packet based on the validation.

18. The method of claim 15, wherein the process data comprises a plurality of data packets, and comprising:

combining the plurality of data packets to regenerate the process data; and transmitting the process data to the computing device.

19. The method of claim 15, wherein the process data comprises one or more data packets.

20. The method of claim 15, wherein the process data corresponds to an operation of an industrial automation process performed in the industrial system.

\* \* \* \* \*